United States Patent
Peng

(10) Patent No.: US 12,158,872 B2
(45) Date of Patent: Dec. 3, 2024

(54) DYNAMIC BUFFER LOOKAHEAD IN ADAPTIVE STREAMING USING MACHINE LEARNING

(71) Applicant: Vimeo, Inc., New York, NY (US)

(72) Inventor: Fengjiao Peng, New York, NY (US)

(73) Assignee: Vimeo.com, Inc., New York, NY (US)

( * ) Notice: Subject to any disclaimer, the term of this patent is extended or adjusted under 35 U.S.C. 154(b) by 256 days.

(21) Appl. No.: 17/194,778

(22) Filed: Mar. 8, 2021

(65) Prior Publication Data

US 2021/0279222 A1    Sep. 9, 2021

Related U.S. Application Data

(60) Provisional application No. 62/986,891, filed on Mar. 9, 2020.

(51) Int. Cl.
| | | |
|---|---|---|
| G06F 16/00 | (2019.01) | |
| G06F 16/22 | (2019.01) | |
| G06N 3/04 | (2023.01) | |
| G06N 3/08 | (2023.01) | |

(52) U.S. Cl.
CPC ............ *G06F 16/2282* (2019.01); *G06N 3/04* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 9,854,020 | B1* | 12/2017 | Kum | ................ H04L 65/752 |
| 10,194,188 | B1* | 1/2019 | Kum | ................ H04L 65/80 |
| 10,271,112 | B2* | 4/2019 | Xiaoqi | ............ H04N 21/44209 |
| 10,887,642 | B1* | 1/2021 | Shams | .............. H04N 21/2662 |
| 11,140,429 | B1* | 10/2021 | Johnson | ........... H04N 21/23655 |
| 11,758,203 | B2* | 9/2023 | Hao | ................ H04N 21/23106 |
| | | | | 709/227 |
| 2013/0067052 | A1* | 3/2013 | Reynolds | ......... H04N 21/23424 |
| | | | | 709/223 |

(Continued)

FOREIGN PATENT DOCUMENTS

| | | | | |
|---|---|---|---|---|
| CN | 110087109 A | * | 8/2019 | ............ H04L 67/06 |
| CN | 110620937 A | * | 12/2019 | ....... H04N 21/23418 |

(Continued)

OTHER PUBLICATIONS

Fastconv: Fast Learning Based Adaptive BitRate Algorithm for Video Streaming, Meng et al., IEEE (Year: 2019).*

(Continued)

*Primary Examiner* — Jean M Corrielus
(74) *Attorney, Agent, or Firm* — BakerHostetler

(57) ABSTRACT

A method and system for adaptive video streaming receives inputs by a deep learning neural network engine. The inputs may include a previous lookahead buffer size, previous download time(s), a current buffer size, next available stream size(s), a last chuck quality, a current buffer size, previous download speed(s), a previous lookahead buffer size, a number of chunks remaining, and/or network condition statistics based upon geolocation information. The inputs are processed by the deep learning neural network engine using a neural network machine learning model to adjust a capacity of a buffer lookahead.

20 Claims, 3 Drawing Sheets

(56) References Cited

U.S. PATENT DOCUMENTS

| | | | | |
|---|---|---|---|---|
| 2014/0052846 | A1* | 2/2014 | Scherkus | H04N 21/6581 709/224 |
| 2014/0089469 | A1* | 3/2014 | Ramamurthy | H04N 21/234363 709/219 |
| 2015/0113104 | A1* | 4/2015 | Ma | H04L 65/611 709/219 |
| 2016/0381112 | A1* | 12/2016 | Ramamurthy | H04N 21/2402 709/219 |
| 2017/0026713 | A1* | 1/2017 | Yin | H04N 21/643 |
| 2017/0155932 | A1* | 6/2017 | Fu | H04N 21/23439 |
| 2018/0288459 | A1* | 10/2018 | Ramaraj | H04L 65/1069 |
| 2019/0379605 | A1* | 12/2019 | Pfister | H04L 47/125 |
| 2021/0073612 | A1* | 3/2021 | Vahdat | G06N 3/048 |
| 2021/0185368 | A1* | 6/2021 | Hao | H04N 21/8456 |

FOREIGN PATENT DOCUMENTS

| | | | | |
|---|---|---|---|---|
| EP | 2311260 | B1 * | 12/2014 | H04N 21/23406 |
| JP | 2000083068 | A * | 3/2000 | H04N 21/4147 |

OTHER PUBLICATIONS

Advancing user quality of experience in 360-degree video streaming, Park et al., IEEE (Year: 2019).*
Dynamic Adaptive Streaming Control based on Deep Reinforcement Learning in Named Data Networking, Qiu et al., IEEE (Year: 2018).*
On the use of location window in geo-intelligent HTTP adaptive video streaming, Fardous et al., IEEE (Year: 2012).*
HotDASH-Hotspot Aware Adaptive Video Streaming Using Deep Reinforcement Learning, Sengupta et al., (Year: 2018).*
A Hybrid Model of Adaptive Video Streaming Control System, Cofano et al., IEEE (Year: 2016).*
A QoE-Based Control System for Bitrate Adaption of Wireless-Accessed Video Stream, Ge et al., IEEE (Year: 2016).*
Adaptive Bitrate Control of Scalable Video for Live Video Streaming on Best-effort Network, IEEE, Nihei et al., (Year: 2017).*
Adaptive Bitrate Video Streaming in Non-Orthogonal Multiple Access Networks, IEEE, Zhang et al., (Year: 2020).*
Deep Reinforced Bitrate Ladders for Adaptive Video Streaming, Huang et al., (Year: 2021).*
YouSlow—A Performance Analysis Tool for Adaptive Bitrate Video Streaming, Nam et al., (Year: 2014).*
Video Code Rate Self-adapting Method and Device, CN 110087108 A (Year: 2019).*
Improving Efficiency of Remote Construction by using Adaptive Video Streaming, IEEE, Yoshida et al., (Year: 2021).*
Anirban et al., article entitled "Deep Learning based Prediction Model for Adaptive Video Streaming" (Year: 2020).*

* cited by examiner

DYNAMIC BUFFER LOOKAHEAD IN ADAPTIVE STREAMING USING MACHINE LEARNING

CROSS REFERENCE TO RELATED APPLICATIONS

This application claims the benefit of U.S. Provisional Application No. 62/986,891, filed Mar. 9, 2020, entitled "Dynamic Buffer Lookahead in Adaptive Streaming Using Machine Learning," which is hereby incorporated by reference herein in its entirety.

BACKGROUND

The current disclosure relates to streaming video technology. Adaptive bitrate streaming (ABR) works by detecting a user's bandwidth and buffer size in real time and adjusting the quality of the video streaming accordingly. This can reduce rebuffering, improve playback quality and optimize the user's quality of experience (QoE).

SUMMARY

QoE can be further improved by other actions than adjusting quality, such as canceling a video segment download or dynamically adjusting the capacity of the buffer lookahead (the maximum number of chunks to preload). The current disclosure provides a deep neural network engine (NNE) that automatically selects quality and automatically adjusts buffer lookahead. In an embodiment, the NNE may operate without human interventions. Adding dynamic buffer lookahead enables a more powerful ABR system for QoE optimization, while reducing streaming cost.

In an aspect, a method for adaptive video streaming is provided that includes: receiving as inputs by NNE, (a) previous video segment size, (b) previous download times, (c) current buffer size, and (d) available stream sizes; and processing, by the NNE, the inputs using a neural network machine learning model to adjust the capacity of the buffer lookahead. In a further detailed embodiment, the inputs include (e) one or more network condition statistics based upon geolocation information (the one or more network condition statistics may be obtained by querying a lookup table against a current geolocation). Alternatively, or in addition, the processing step further selects a video quality using the neural network machine learning model. Alternatively, or in addition, the neural network machine learning model is trained using a reinforcement learning framework (the learning model may be trained with throughput history in prior playback sessions and real video manifests of the associated videos).

In another aspect, a method for adaptive video streaming is provided that includes: receiving as inputs by NNE, (i) last chuck quality, (ii) current buffer size, (iii) previous download speeds, (iv) previous download times, (v) next available stream sizes, (vi) previous un-played buffer size and (vii) number of chunks remaining; and processing, by the NNE, the inputs using a neural network machine learning model to adjust the capacity of the buffer lookahead. In a further detailed embodiment, the inputs include (vii) one or more network condition statistics based upon geolocation information (the one or more network condition statistics may be obtained by querying a lookup table against a current geolocation). Alternatively, or in addition, the processing step further selects a video quality using the neural network machine learning model. Alternatively, or in addition, the neural network machine learning model is trained using a reinforcement learning framework (the learning model may be trained with throughput history in prior playback sessions and real video manifests of the associated videos).

In another aspect, a neural network machine learning engine is provided to perform any of the above-summarized steps. In a further detailed embodiment, the deep learning neural network engine includes two convolutional layers and six dense layers.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
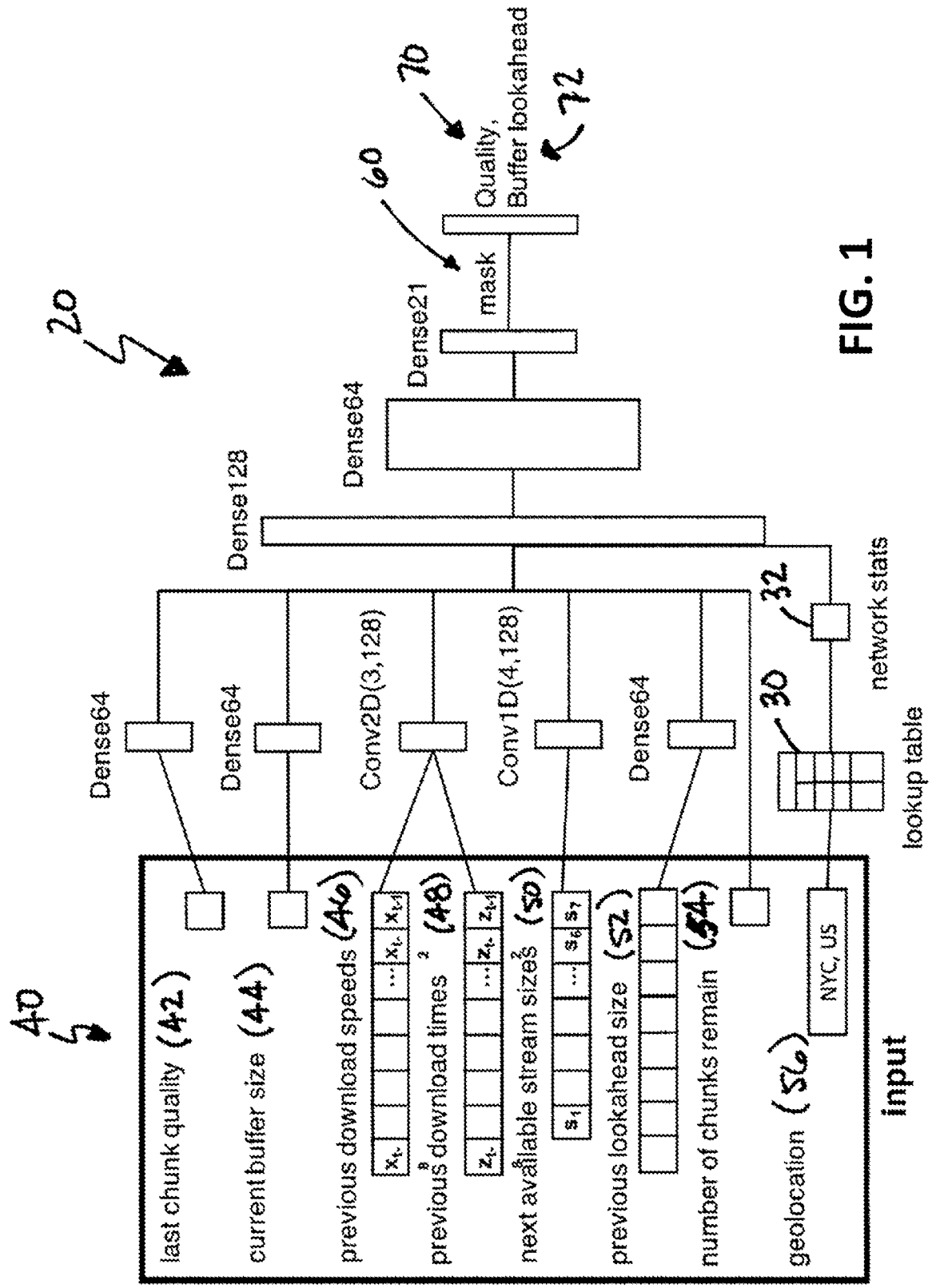
FIG. 1 is an example illustration of a deep neural network engine with two convolutional layers and six dense layers according to an embodiment of the present disclosure.

Referring to FIG. 1, the current disclosure provides a deep neural network engine (NNE) 20 with two convolutional layers and six dense layers. The NNE 20 receives previous lookahead size, previous download times, current buffer size, and available stream sizes as input. The NNE 20 outputs a selected video quality and a selected buffer lookahead size. Using a large amount of streaming data from a video streaming platform (such as Vimeo), the NNE may be trained using a reinforcement learning framework, such as a framework called A3C.

In an embodiment, to ensure that the NNE adapts to various network conditions around the world, a table 30 of 20,000 geolocations to their unique network conditions is added to the model. Adding the network statistics 32 based upon the geolocation lookup as an input to the NNE 20 may help the model better predict network variation in a session. The table 30 may be updated periodically.

The video streaming platform may generate per-chunk logs in the streaming video player to track the size and download time of each video chunk played. Such throughput history may be recovered. This throughput history, together with actual video manifests of streaming platform videos, may comprise the training data for the NNE.

Referring to FIG. 1, an input model 40 to the NNE 20 includes inputs that describe what has happened in the past before choosing the next video chunk by the NNE 20. Last Chuck Quality 42 is the quality selection for the previous chunk of video data; Current Buffer Size 44 is the amount of video inside the current buffer; Previous Download Speeds 46 is for previous $X_t$ chunks, how fast was the download speed (size/time) to download; Previous Download Times 48 is for previous $Z_t$ chunks, the time to download; Next Available Stream Size 50 is, for each available speed (360p, 540p, 720p, etc.) how large the next stream would be; Previous Lookahead Buffer Size 52 is, when the previous $Z_t$ chunks started to be downloaded, how long was the length of video already downloaded, but yet to be played; Number of Chunks Remaining 54 is how many video chunks remain in the future; and Geolocation 56 is a string (e.g., NYC, US) indicating current location of the user for input to the lookup table 30. In an exemplary embodiment, the lookup table 30 takes Geolocation 56 as the input, and outputs the average throughput, 95-percentile of throughput, throughput variation of that geolocation, as measured in the most recent three months on the video streaming platform.

In an embodiment, the NNE 20 includes two convolutional layers and six dense layers. The Conv2D layer extracts temporal features from previous download times and previous download speeds. The Conv1D layer extracts features and size comparison from next available stream sizes. The other three Dense64 layers connected to model inputs are used to extract features from each input. The Dense128 layer concatenates all the extracted features and network statistics, followed by another hidden layer Dense64 to further condense the feature maps. The Dense21 layer gives final logits before applying the mask. A softmax function is applied to the Mask 60 for the final probabilities.

The Mask 60 filters from 7 available video stream sizes and 3 lookahead sizes, which makes in total 21 (video steam/lookahead) combinations. For example, older videos may only have two stream sizes and the Mask 60 will provide just two outputs based on the two available stream sizes. In this situation, if dynamic lookahead is also needed as an output, and two lookahead sizes are available, the Mask 60 will provide 4 outputs, each pointing to (video stream 1, lookahead 1), (video stream 1, lookahead 2), (video stream 2, lookahead 1), (video stream 2, lookahead 2). This knowledge is obtained from the video player.

Quality 70 is the video quality selected by the NNE 20, and Buffer Lookahead 72 is the buffer lookahead size selected by the NNE 20.

The NNE 20 may be trained using array enforcement learning. Such training is started with an un-trained model loaded into a simulated offline video player. At a high level, the model is trained by providing it training sets and penalizing the model when it makes bad choices (e.g., selected quality is too high leading to rebuffering).

An embodiment of the current disclosure is adapted from an MIT model called Pensieve. Pensieve is a model designed only to adjust video quality. Pensieve is trained on simulated video data and publicly available network traces.

The current embodiment is trained using real video data from a video sharing platform, such as Vimeo along with network traces in previous playback sessions on the video sharing platform. This may include 40K videos on Vimeo and three most recent months of playback sessions on Vimeo.

As compared to Pensieve, the current NNE 20 uses 4 hidden layers instead of 2. The two new layers are Dense64 and Dense21. The current NNE 20 also uses the following additional inputs not used by Pensieve: Previous Lookahead Size 52, and Geolocation 56. Further, Pensieve does not include the Geolocation lookup table 30, which takes geolocation 56 and outputs network statistics 32 of that geolocation. Pensieve's output is a 1 dimensional vector of (# of qualities), while the current NNE 20 output is 1 dimensional vector of (# of qualities) times (# of buffer lookaheads).

The training for NNE 20 is based on reinforcement learning framework A3C. In this framework, there is an actor and a critic. Given a state, the actor decides on an action. The critic predicts what the baseline reward in this state is. The actor is then told how much his action is better or worse than the baseline reward, and tries to improve upon that.

Pensieve's reward function has 3 components: video quality, quality switch counts, and rebuffering. The current NNE 20 training framework has the same 3 components in addition to a $4^{th}$ component: excessive lookahead size. This 4th component penalizes too high of a buffer lookahead choice.

Figure 2:
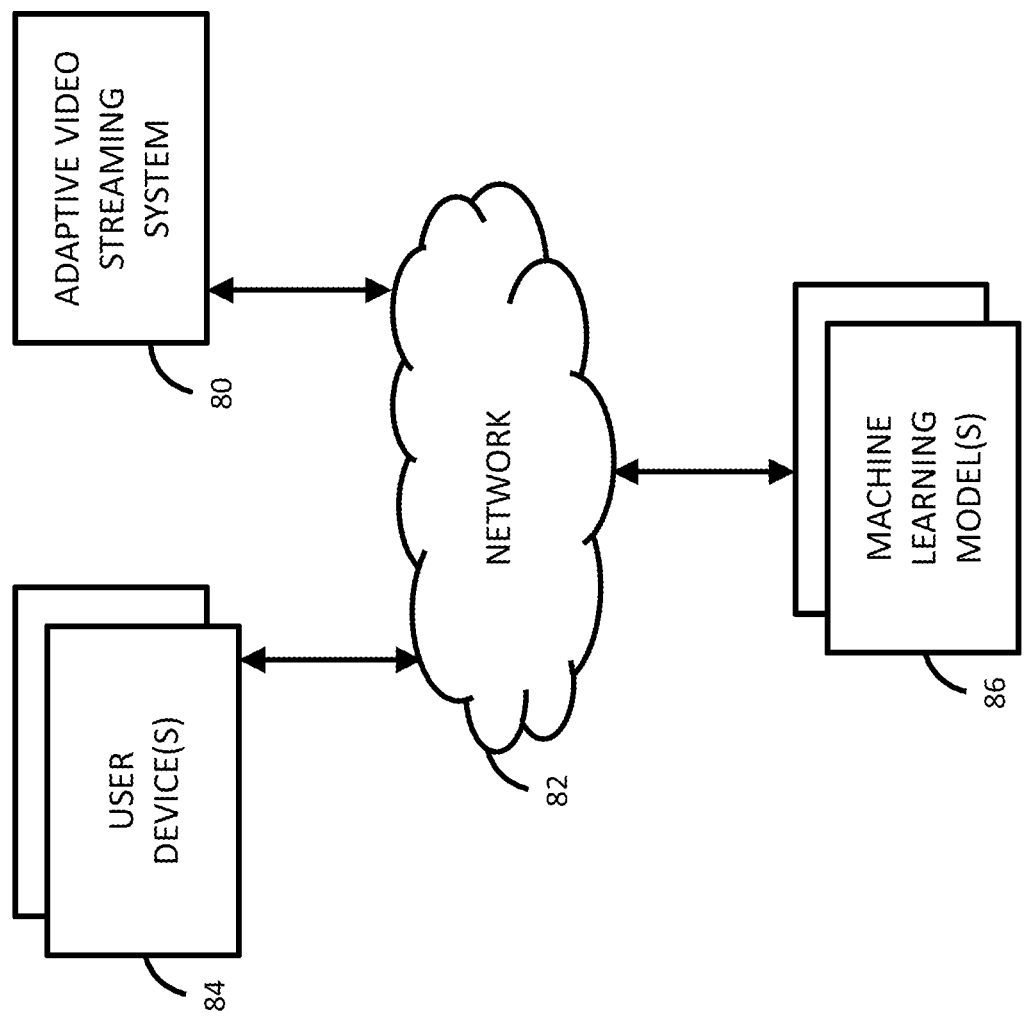
FIG. 2 is a schematic view of an adaptive video streaming system, one or more machine learning models, and one or more user devices consistent with embodiments of the invention.

FIG. 2 provides a block diagram illustrating the one or more devices and/or systems consistent with embodiments of the invention. As shown in FIG. 2, an Adaptive Video Streaming system 80 may be implemented as one or more servers (e.g., including two convolutional layers and six dense layers). The Adaptive Video Streaming system 80 may be connected to a communication network 82, where the communication network 82 may comprise the Internet, a local area network (LAN), a wide area network (WAN), a cellular voice/data network, one or more high speed bus connections, and/or other such types of communication networks. One or more user devices 84 may be connected to the communication network 82, such that a user may initialize a session with the Adaptive Video Streaming system 80 to communicate human experience touchpoints and/or other such relevant data to the Adaptive Video Streaming system 80. The user device 84 may be a personal computing device, tablet computer, thin client terminal, smart phone and/or other such computing device.

One or more machine learning models 86 may be connected to the communication network 82. The Adaptive Video Streaming system 80 may initialize a session over the communication network 82 with each machine learning model 86. In some embodiments, a user may interface with the Adaptive Video Streaming system 80 using the user device 84 in a video streaming session to provide human experience touchpoints. In turn, the Adaptive Video Streaming system 80 may interface with machine learning model 86 to adjust a capacity of a buffer lookahead. Furthermore, as will be appreciated, in some embodiments the Adaptive Video Streaming system 80 may select a video quality using the machine learning model 86.

As will be described in detail below, consistent with some embodiments, an interface may be generated by the Adaptive Video Streaming system 80 such that a user may input information at a user device 84 that may be utilized to capture human experience touchpoints that may in turn be used to adjust a capacity of a buffer lookahead consistent with embodiments of the invention. To adjust the capacity of the buffer lookahead, the Adaptive Video Streaming system 80 may interface with one or more machine learning models 86 to process one or more inputs (e.g., a previous lookahead buffer size, one or more previous download times, a current buffer size, one or more next available stream sizes, a last chuck quality, a current buffer size, one or more previous download speeds, a number of chunks remaining, and/or one or more network condition statistics based upon geolocation information). In some embodiments, the one or more machine learning model 86 may be trained using a reinforcement learning network. For example, the machine learning model 86 may be trained with throughput history in prior playback sessions and real video manifests of one or more associated videos.

In some embodiments, the Adaptive Video Streaming system 80 may be trained using a reinforcement learning network. For example, a training methodology may include an actor and a critic. The actor may decide on an action and the critic may predict a baseline reward based on a state. The actor may improve upon the decided action based upon a comparison of the decided action and the baseline reward. For example, the baseline reward may be based on a reward function and the reward function may be based on one or more of video quality, one or more quality switch counts, rebuffering, and a buffer lookahead size.

Figure 3:
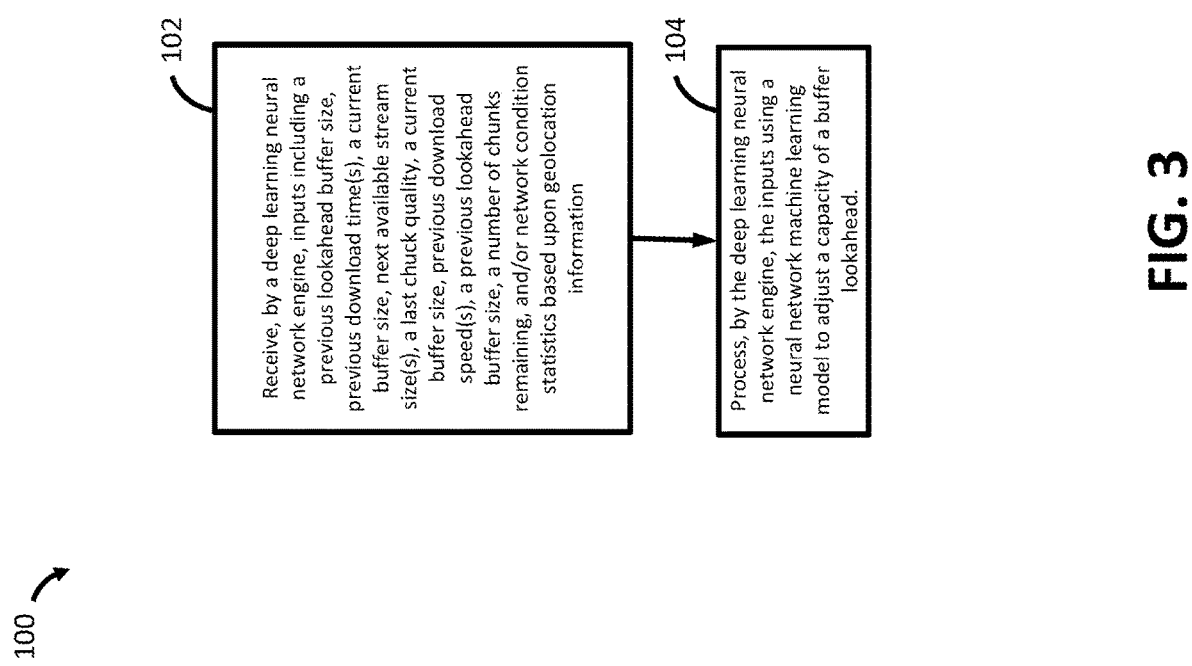
FIG. 3 is a flowchart illustrating a sequence of operations that can be performed by adaptive video streaming system of FIG. 2 according to an aspect of the application.

FIG. 3 illustrates an exemplary flowchart of a method 100 for adaptive video streaming according to an aspect of the application. The method 100 may be performed at a network device, UE, desktop, laptop, mobile device, server device, or by multiple devices in communication with one another. In some examples, the method 100 is performed by processing logic, including hardware, firmware, software, or a combination thereof. In some examples, the method 100 is performed by a processor executing code stored in a computer-readable medium (e.g., memory).

As shown in method 100, at block 102, the method 100 may receive one or more inputs by a deep learning neural network engine. For example, the method 100 may receive inputs including a previous lookahead buffer size, previous download time(s), a current buffer size, next available stream size(s), a last chuck quality, a current buffer size, previous download speed(s), a previous lookahead buffer size, a number of chunks remaining, and/or network condition statistics based upon geolocation information (e.g., obtained by querying a lookup table against a current geolocation).

At block 104, the method 100 may process, by the deep learning neural network engine, the inputs using a neural network machine learning model to adjust a capacity of a buffer lookahead. For example, the method 100 may select a video quality using the neural network machine learning model. In some embodiments, the neural network machine learning model may be trained using a reinforcement learning framework. For example, the learning model may be trained with throughput history in prior playback sessions and real video manifests of one or more associated videos.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a communication network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. A method for adaptive video streaming comprising:
receiving, by a deep learning neural network engine, inputs including (a) a previous lookahead buffer size, (b) one or more previous download times, (c) a current lookahead buffer size, (d) one or more next available stream sizes, and (e) one or more network condition statistics based upon geolocation information; and
adjusting the current lookahead buffer size based on processing, by the deep learning neural network engine, the inputs using a neural network machine learning model.

2. The method of claim 1, wherein processing the inputs using the neural network machine learning model comprises selecting a video quality.

3. The method of claim 1, wherein the (e) one or more network condition statistics are obtained by querying a lookup table against a current geolocation.

4. The method of claim 1, wherein the neural network machine learning model is trained using a reinforcement learning framework.

5. The method of claim 1, wherein adjusting the current lookahead buffer size comprises adjusting a number of data chunks comprised by a lookahead buffer.

6. A method for adaptive video streaming comprising:
receiving, by a deep learning neural network engine, inputs including (a) a previous lookahead buffer size, (b) one or more previous download times, (c) a current lookahead buffer size, and (d) one or more next available stream sizes; and
adjusting the current lookahead buffer size based on processing, by the deep learning neural network engine, the inputs using a neural network machine learning model;
wherein the neural network machine learning model is trained with throughput history in prior playback sessions and real video manifests of one or more associated videos.

7. A method for adaptive video streaming comprising:
receiving as inputs, (i) a last chunk quality, (ii) a current size of a lookahead buffer, (iii) one or more previous download speeds, (iv) one or more previous download times, (v) one or more next available stream sizes, (vi) a previous size of the lookahead buffer, (vii) a number of chunks remaining and (viii) one or more network condition statistics based upon geolocation information; and
processing the inputs using a neural network machine learning model to determine a new size of the lookahead buffer.

8. The method of claim 7, wherein the processing step further selects a video quality using the neural network machine learning model.

9. The method of claim 7, wherein the (viii) one or more network condition statistics are obtained by querying a lookup table against a current geolocation.

10. The method of claim 7 wherein the neural network machine learning model is trained using a reinforcement learning framework.

11. A method for adaptive video streaming comprising:
receiving as inputs, (i) a last chunk quality, (ii) a current size of a lookahead buffer, (iii) one or more previous download speeds, (iv) one or more previous download times, (v) one or more next available stream sizes, (vi) a previous size of the lookahead buffer and (vii) a number of chunks remaining; and
processing the inputs using a neural network machine learning model to determine a new size of the lookahead buffer;
wherein the learning model is trained with throughput history in prior playback sessions and real video manifests of one or more associated videos.

12. A system for adaptive video streaming comprising:
a deep learning neural network engine configured to:
receive as inputs, (a) a previous lookahead buffer size, (b) one or more previous download times, (c) a current lookahead buffer size, and (d) one or more next available stream sizes; and
adjust the current lookahead buffer size based on processing the inputs using a neural network machine learning model;
wherein the neural network machine learning engine is trained using a reinforcement learning framework.

13. The adaptive video streaming system of claim 12, wherein the deep learning neural network engine includes two convolutional layers and six dense layers.

14. The adaptive video streaming system of claim 12, wherein the training methodology includes an actor and a critic.

15. The adaptive video streaming system of claim 14, wherein the actor decides on an action and the critic predicts a baseline reward based on a state.

16. The adaptive video streaming system of claim 15, wherein the actor improves upon the decided action based upon a comparison of the decided action and the baseline reward.

17. The adaptive video streaming system of claim 15, wherein the baseline reward is based on a reward function.

18. The adaptive video streaming system of claim 17, wherein the reward function is based on video quality, one or more quality switch counts, rebuffering, and the current buffer lookahead size.

19. The system of claim 12, wherein adjusting the current lookahead buffer size comprises adjusting a number of data chunks comprised by a lookahead buffer.

20. A method for adaptive video streaming comprising:
transmitting to a deep learning neural network engine, inputs including (a) a previous lookahead buffer size, (b) one or more previous download times, (c) a current lookahead buffer size, and (d) one or more next available stream sizes; and
receiving, from the deep learning neural network engine, an adjusted lookahead buffer size, wherein the adjusted lookahead buffer size comprises adjustments by the deep learning neural network engine based on processing the inputs using a neural network machine learning model;
wherein the deep learning neural network engine is trained using history of prior playback sessions.

* * * * *